United States Patent
Yang et al.

(10) Patent No.: US 9,034,995 B2
(45) Date of Patent: May 19, 2015

(54) SYSTEM AND PROCESS FOR RECOVERING GAS EMISSIONS GENERATED IN PRODUCING OLEFIN POLYMERS

(71) Applicant: Hangzhou Shuang'an Science and Technology Company Limited, Hongzhou, Zhejiang Province (CN)

(72) Inventors: Yongrong Yang, Hangzhou (CN); Zhongwei Yang, Handan (CN); Jingdai Wang, Hangzhou (CN); Zhengliang Huang, Hangzhou (CN); Binbo Jiang, Hangzhou (CN); Zuwei Liao, Hangzhou (CN)

(73) Assignees: Hangzhou Shuang'an Science and Technology Company Limited, Zhejiang Province (CN); Zhongwei Yang, Hebei Province (CN)

( * ) Notice: Subject to any disclaimer, the term of this patent is extended or adjusted under 35 U.S.C. 154(b) by 0 days.

(21) Appl. No.: 14/260,560

(22) Filed: Apr. 24, 2014

(65) Prior Publication Data

US 2015/0086429 A1    Mar. 26, 2015

(30) Foreign Application Priority Data

Sep. 25, 2013  (CN) .......................... 2013 1 0444283

(51) Int. Cl.
*C08F 2/00* (2006.01)
*C08F 10/00* (2006.01)
(Continued)

(52) U.S. Cl.
CPC ...................................... *B01J 19/245* (2013.01)

(58) Field of Classification Search
CPC ................. B01J 2208/0274; B01J 2208/0283; B01J 2208/00327; C07C 2/76; C08F 110/02; C08F 110/06; C10G 9/16

USPC ........... 526/61, 65, 53, 348, 72; 422/109, 129
See application file for complete search history.

(56) References Cited

U.S. PATENT DOCUMENTS 4,372,758 A    2/1983   Bobst et al.
4,690,695 A    9/1987   Doshi
(Continued)

FOREIGN PATENT DOCUMENTS

CN     87103695 A      11/1987
CN    201495195 U       6/2010
(Continued)

OTHER PUBLICATIONS

EP Search Report from BE Application No. BE 201400403, Mar. 6, 2015.
(Continued)

*Primary Examiner* — William Cheung
(74) *Attorney, Agent, or Firm* — Workman Nydegger

(57) ABSTRACT

The present disclosure provides a system for recovering emissions generated from an olefin polymerization process, comprising: a devolatilizer for receiving a fresh sweep gas and emissions generated from the olefin polymerization process and outputting a first fluid and a polyolefin resin; a compression refrigeration unit including a compression device and a first heat exchange device, for receiving said first fluid and outputting a first gas-liquid mixture; a first gas-liquid separation device for separating the first gas-liquid mixture and outputting a first recovery product and a first gas phase composition; a first gas separation device for receiving the first gas phase composition, removing small molecular substances therefrom, and outputting a composition rich in small molecular gases and a second gas phase composition rich in hydrocarbons; and a second gas separation device having a second heat exchange device, a second gas-liquid separation device, and a first gas expansion device.

12 Claims, 6 Drawing Sheets

(51) Int. Cl.
  *G05D 23/00* (2006.01)
  *B01J 10/00* (2006.01)
  *B01J 19/24* (2006.01)

(56) References Cited

U.S. PATENT DOCUMENTS

| | | |
|---|---|---|
| 5,085,774 A | 2/1992 | Ekiner et al. |
| 5,391,656 A | 2/1995 | Campbell et al. |
| 5,521,264 A | 5/1996 | Mehra et al. |
| 5,681,908 A | 10/1997 | Mehra et al. |
| 8,314,197 B2 | 11/2012 | Chamayou et al. |
| 2004/0242810 A1 | 12/2004 | Bell et al. |
| 2011/0160420 A1 | 6/2011 | Chamayou et al. |
| 2013/0291720 A1 | 11/2013 | Blood et al. |

FOREIGN PATENT DOCUMENTS

| | | | |
|---|---|---|---|
| CN | 102171256 A | | 8/2011 |
| CN | 102389643 A | | 3/2012 |
| CN | 202485331 | * | 10/2012 |
| CN | 202485331 U | | 10/2012 |
| CN | 202554990 U | | 11/2012 |
| CN | 103298842 A | | 9/2013 |
| EP | 0219878 A2 | | 4/1987 |
| WO | 2012/082674 A1 | | 6/2012 |

OTHER PUBLICATIONS

French Search Report from French Application No. FR 1454807, Mar. 10, 2015.

* cited by examiner

SYSTEM AND PROCESS FOR RECOVERING GAS EMISSIONS GENERATED IN PRODUCING OLEFIN POLYMERS

FIELD OF THE INVENTION

The present disclosure relates to production of olefin polymers, in particular to a system and process for recovering gas emissions generated in the production of olefin polymers.

BACKGROUND OF THE INVENTION

Devolatilization of resins (removal of volatile components in resins) and recovery of gas emissions are both important processes in olefin polymerization, which have been studied in numerous documents. For example, CN 102171256 describes a process and method of resin devolatilization, while in U.S. Pat. No. 5,391,656, it discloses a method for recovering a compressed and condensed gas emission.

Gas emissions generated in producing olefin polymers are gas streams which contain reactant gases discharged from a reactor, a flash tank, a devolatilizer, or the like. For example, gas emissions generated from the serous-polyethylene production process mainly come from flash tanks or devolatilizers, while gas emissions generated from the gas phase process are mainly from devolatilizers. As processes and production grades vary, the reactant gas comprises various kinds of hydrocarbons (including monomers, comonomers, condensing agents, solvents, reaction byproducts, alkane impurities, etc.), inert gases, other small molecular substances, and the like. Inert gasses generally include nitrogen and saturated hydrocarbons. The former is useful in balancing pressures in the reactor or in transporting catalysts, while the latter enters the reaction system as impurities together with the raw materials. Small molecular substances, e.g., usually hydrogen, are used for adjusting molecular weight of olefin polymers. For example, in the linear low density polyethylene (LLDPE) process for producing ethylene-butylene copolymers, the reactant gasses contain ethylene ($C_2H_4$), butene (n-$C_4H_8$), ethane ($C_2H_6$), butane (n-$C_4H_{10}$), hydrogen ($H_2$), isopentane (i-$C_5H_{12}$), nitrogen ($N_2$), etc. Resins and reactant gasses discharged from the reactor are fed to the resin devolatilizer together, so as to remove hydrocarbons carried by or dissolved in the resins. In some processes, nitrogen is used for carrying solid resins from the reaction system to the devolatilizer, for which reference can be made to U.S. Pat. No. 4,372,758.

The operating pressure in a devolatilizer is far less than that in the reaction system, such that the moment a resin enters the devolatilizer, a majority of hydrocarbons carried would be rapidly separated therefrom. After entering the devolatilizer from an upper portion thereof, the resin would flow downward in a dense-phase flow with a certain material level maintained. In order to remove the hydrocarbons dissolved in the resin, inert gases are fed into the devolatilizer from a middle portion and a lower portion thereof, usually nitrogen as a sweep gas, which is mainly used for further lowering the partial pressure of the hydrocarbons. The sweep gas flows from bottom to top and removes the residual hydrocarbons in interacting with the resin. The resin devolatilization is performed in order to secure operations in downstream devices for granulation, air feeding, etc., facilitate storage and transport of polyolefin products, and reduce peculiar smells of the products as well.

Gases discharged from a top portion of the devolatilizer are referred to as gas emissions, which comprise all the reactant gasses separated from the resin in the devolatilizer and the aforementioned sweep gas. Obviously, the gas emissions contain a huge amount of hydrocarbons, which would cause severe material wastes, economic losses, and environment pollutions in case of direct vent or discharge into a flare system without being recycled. Therefore, recycling of hydrocarbons in gas emissions is of significant importance.

Gas emissions generally contain a low content of hydrocarbons, and therefore cannot be directly recycled to the reaction system or other process devices for use, so that a device for recovering the gas emissions is usually necessary. The device for recovering gas emissions, substantially a separation device of hydrocarbons and sweep gasses, on the one hand, concentrates the hydrocarbons and then feeds the concentrated hydrocarbons to the reaction system or other process devices, and on the other hand, concentrates the sweep gasses and then feeds the concentrated sweep gasses to a devolatilizer for reuse. However, gas emissions with low pressure and low concentration in hydrocarbons are rather difficult to be recycled.

The compression refrigeration process, a traditional gas separation process, has been widely used for recovering gas emissions generated in producing polyolefins owning to simple process steps and large handling capacity thereof. The process steps of compression refrigeration are as follows. The gas emissions are first fed into a low pressure cooler. Where the cooler has an outlet temperature lower than the dew-point of the gas emissions, some heavy hydrocarbon components would be condensed, so that the gas emissions would enter a low-pressure condensate tank as a gas-liquid mixture and condensed liquids are recovered therein. In order to further recover hydrocarbons, the non-condensed gas is first compressed by a compressor for improving dew-points thereof and then cooled and condensed respectively by a high-pressure cooler and a high-pressure condenser. Next, a gas-liquid mixture enters a high-pressure condensate tank for gas-liquid separation. The separated condensate and the low-pressure condensate can both be fed back to the reaction system for reuse, while the gas is discharged to the flare. Obviously, the compression refrigeration process can be used for recovering hydrocarbon components (condensable hydrocarbons) heavier than sweep gasses. However, as discussed above, the gas emissions contain merely a small amount of condensable hydrocarbons, and therefore a large amount of non-condensable gasses are compressed and cooled in vain, thus reducing the economy of the compression refrigerating process. As can be seen, the compression refrigeration process mainly has the following disadvantages: 1) the lower the content of condensable hydrocarbons in the gas emissions is, the lower the efficiency of the compression refrigeration process will be; 2) C1 to C3 hydrocarbons with the boiling points thereof close to the boiling point of the sweep gas (nitrogen) are difficult to be recovered, usually with a recovery rate of not more than 30%; and 3) the concentration of the sweep gas in the non-condensed gas emissions fails to reach the requirements for devolatilization and therefore can only be discharged to the flare system due to its incapacity of being recycled.

U.S. Pat. No. 5,521,264 discloses a process for recovering unreacted monomers by physical absorption and desorption. The process comprises treating a gas emission by a compression refrigeration system, and recovering a condensate while a non-condensed gas emission entering an absorption column; absorbing hydrocarbons in the non-condensed gas emission by an absorbent in the absorption column to obtain a top gas stream containing nitrogen and light components, and a bottom liquid stream containing the absorbent and monomers that are absorbed, wherein the top gas stream is optionally discharged to a flare, to serve as a transport gas, or fed to a degassing position, while the bottom liquid stream enters a desorption column; and separating the absorbent and monomers in the desorption column to obtain a top stream containing monomers and a bottom stream containing the absorbent, wherein the bottom stream returns to the absorption column for reuse while the monomers return to the reaction system. Besides, U.S. Pat. No. 5,681,908 improves the process as disclosed in U.S. Pat. No. 5,521,264 with an addition of a separation process of byproducts so as to prevent enrichment of the byproducts in the system. Although the absorption-desorption process enables further recovery of hydrocarbons on the basis of the compression refrigeration process, it largely raises operating and investment costs due to complex process steps, large quantity of devices, and additional energy consumption and utilities in repeated heating and cooling of a large number of absorbents.

CN 200920203363.X discloses a process for recovering propylene in the production of polypropylene, wherein the gas emissions generated in the production passes through a dust filter, a buffer gas cabinet, a compressor, and a condenser to generate a gas-liquid mixture, which is fed into a gas-liquid separator for gas-liquid separation. A non-condensable gas obtained therein, after filtration and heat tracing, enters a membrane separator, while hydrocarbon components such as propylene enrich in a membrane permeation side and return to an inlet of the compressor. In the above application, the recovery rate of propylene is improved to 99% by the combination of the compression refrigeration and membrane separation processes. However, as pointed out in CN 87103695, a gas adequately pure for direct reuse cannot be obtained by separation performed in the membrane system. To solve the above problem, the membrane separation system has to be combined with other processes (e.g. a process combined with a pressure swing absorption device as disclosed in CN 87103695) for further gas purification. Alternately, repeat compressions in the compressor can be carried out as proposed in CN 200920203363.X. The above two processes can both greatly increase investments and energy consumption.

CN 202485331 discloses a process for recovering gas emissions generated in the membrane separation. In the process, a cryogenic process is performed for further recovering hydrocarbons in view of the membrane system. In the cryogenic process, a pressure of a tail gas does work through a turboexpander, so as to achieve the low temperature required in the condensation of light components such as ethylene. However, this process cannot be satisfactorily combined with the devolatilization of polyolefin processes. For example, the tail gas generated in the process cannot be further recycled due to too low a pressure thereof. Meanwhile, where there is a high content of hydrogen, recycling of a sweep gas would result in enrichment of hydrogen in the system, thus causing a series of problems such as reduction of the recovery rate.

To conclude the above, although the processes and devices for recovering gas emissions generated in the production of olefin polymers in the prior art are rather distinctive. None of the processes or devices can achieve high-efficient recovery and recycling of sweep gasses.

SUMMARY OF THE INVENTION

To solve the above problems, the present disclosure provides a system and process for recovering gas emissions generated from an olefin polymerization process. The system and process can recover hydrocarbons of low boiling points at low energy consumption and investment costs, and meanwhile produce a sweep gas that can be recycled.

According to the present disclosure, it provides a system for recovering emissions generated from an olefin polymerization process comprising: a devolatilizer for receiving a fresh sweep gas and emissions generated from the olefin polymerization process and outputting a first fluid and a polyolefin resin; a compression refrigeration unit having a compression device and a first heat exchange device, for receiving said first fluid and outputting a first gas-liquid mixture; a first gas-liquid separation device for separating the first gas-liquid mixture and outputting a first recovery product and a first gas phase composition; a first gas separation device for receiving the first gas phase composition, removing small molecular substances therefrom, and outputting a composition rich in small molecular gases and a second gas phase composition rich in hydrocarbons; and a second gas separation device having a second heat exchange device, a second gas-liquid separation device, and a first gas expansion device, wherein the second heat exchange device comprises a first flow channel for receiving the second gas phase composition and feeding the same to the second gas-liquid separation device, a second flow channel for receiving a third gas phase composition that comes from the second gas-liquid separation device and feeding the same to the first gas expansion device, a third flow channel for receiving a liquid phase composition that comes from the second gas-liquid separation device and outputting the same as a second recovery product, and a fourth flow channel for receiving a gas that comes from the first gas expansion device and outputting a fourth gas phase composition which includes a recycle sweep gas that can be added to the fresh sweep gas.

According to one specific embodiment, the second gas separation device further comprises a second gas expansion device, and the second heat exchange device further comprises a fifth flow channel, wherein the fourth gas phase composition is output after passing through the second gas expansion device and the fifth flow channel.

According to one specific embodiment, the second gas separation device further comprises a third heat exchange device which has a first flow channel for receiving the liquid phase composition that comes from the second gas-liquid separation device, and outputting a first output portion to a third flow channel of the second heat exchange device and a second output portion which returns to the second gas-liquid separation device, wherein the third heat exchange device has a second flow channel for receiving the second gas phase composition and feeding the same to the first flow channel of the second heat exchange device.

According to one specific embodiment, the second gas separation device further comprises a third gas-liquid separation device and a fourth heat exchange device, wherein the third gas-liquid separation device connects to an outlet of the third flow channel of the second heat exchange device and outputs a third recovery product and a fifth gas phase composition; wherein the fourth heat exchange device has a first flow channel for receiving the fifth gas phase composition that comes from the third gas-liquid separation device, and outputting a third output portion which returns to the third gas-liquid separation device and a fourth output portion as a fourth recovery product; and wherein the fourth heat exchange device has a second flow channel for receiving the first output portion that comes from the first flow channel of the third heat exchange device and outputting the same to the third flow channel of the second heat exchange device.

According to one specific embodiment, the ratio of the second output portion to the sum of the first and second output portions ranges from 0:1 to 1:1, preferably from 0.3:1 to 0.7:1. In another embodiment, the ratio of the third output portion to the sum of the third and fourth output portions ranges from 0:1 to 1:1, preferably from 0.3:1 to 0.7:1.

Preferably, the first gas separation device is configured as a membrane separation system for removing hydrogen from the first gas phase composition. Furthermore, the second gas-liquid separation device is preferably in the form of a separation tank having a bottom heater or in the form of a separation column having a reboiler. In some specific embodiments, the second gas-liquid separation device is constructed as at least one selected from the group consisting of a pressure container, a plate column, and a packed column, preferably containing no internal components.

Preferably, every two adjacent flow channels are configured to have opposite flow directions parallel with each other.

According to one specific embodiment, the first and second gas expansion devices are both in the form of turboexpanders.

According to one specific use of the present disclosure, the first recovery product comprising 1-butene, n-butane, and isopentane, the second recovery product comprising hydrocarbons, the third recovery product comprising 1-butene, n-butane, and isopentane, and the fourth recovery product comprising ethylene and nitrogen are generated.

The system and process for recovering gas emissions according to the present disclosure, suitable for gas emissions generated in any olefin polymerization processes, can greatly improve recovery rates of low-carbon hydrocarbons at low energy consumption and investment costs. Furthermore, recycle of sweep gasses to the devolatilizer devices can be achieved by separation of small molecular substances and improvement in recovery rates of low-carbon hydrocarbons.

DETAILED DESCRIPTION OF THE EMBODIMENTS

Figure 1:
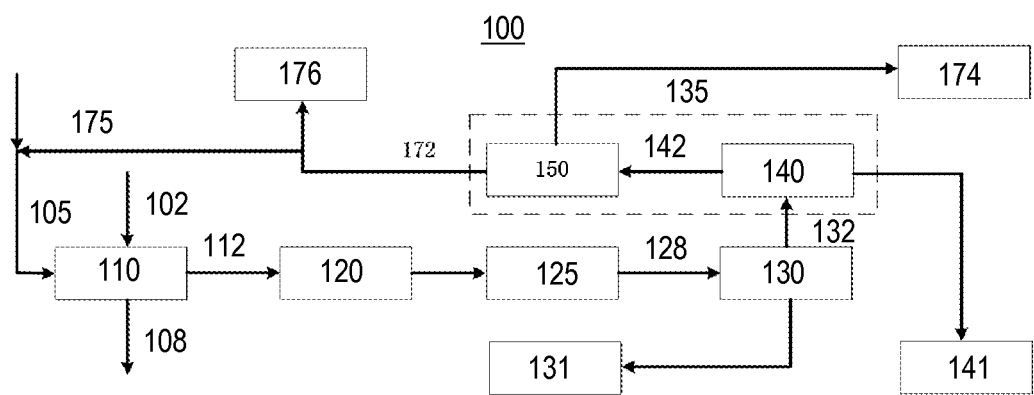
FIG. 1 schematically shows the structure of a first embodiment of a system for recovering gas emissions generated in the production of olefin polymers according to the present disclosure.

The present disclosure will be described in detail below based on the embodiments with reference to the accompanying drawings. It should be noted that the terms "first", "second", and the like are adopted in the following to distinguish devices of the same type, rather than to represent any differences in sequence or importance.

In the present disclosure, the compression refrigeration technique, the membrane separation technique, and the turbine expansion cryogenic technique are combined for the first time, whereby not only high-efficiency recovery of hydrocarbons is achievable, but a tail gas can also be recycled as a sweep gas for use in a resin devolatilizer. The present disclosure is mainly based on the following thoughts. At the outset, the inventor has found out that under a high separation degree between hydrocarbons and the sweep gas, purification of the sweep gas can be accomplished as the hydrocarbons are being recycled, so that processes and operations can be simplified, causing the three process steps, i.e., recycle of hydrocarbons, removal of hydrogen, and purification of nitrogen as described in CN 102389643A being unnecessary. As has been explained in CN 102171256, the content of heavy hydrocarbons rather than a small amount of light hydrocarbons in the sweep gas would influence (or significantly influence) the devocalization effect of the resin in a negative manner. For example, in a process of polyolefin production, at most 5% (mol) of C2 components will be allowable in the sweep gas, while the amount of C4 components therein should be limited to less than 0.1% (mol). The requirements, as have been discovered by the inventor, can be achieved so long as a temperature T1 at a gas phase outlet of a second gas-liquid separation device in the system of the present disclosure is controlled as lower than a certain temperature. Table 1 below indicates the relationship between the temperature T1 at the gas phase outlet of the second gas-liquid separation device and the contents of C2 and C4 components contained in the sweep gas.

TABLE 1

The relationship between the temperature T1 at the gas phase outlet of the second gas-liquid separation device and the contents of C2 and C4 components contained in the sweep gas

| Component | T1 | | | |
| --- | --- | --- | --- | --- |
| | −60 °C | −80 °C | −100 °C | −120 °C |
| C2/mol % | 12.52 | 10.79 | 6.57 | 2.35 |
| C4/mol % | 0.51 | 0.11 | 0.015 | 0.0015 |

Table 1 teaches that for a specific polyolefin process, there exists a specific temperature. When the temperature at the top of the second gas-liquid separation device is lower than the specific temperature, the tail gas thereof can be recycled as a sweep gas. Since the second gas-liquid separation device can be a cryogenic apparatus with a turbine expansion device therein, the temperature T1 at the gas phase outlet of the second gas-liquid separation device can be considered as substantially being determined by the differential pressure from an inlet to an outlet of the turbine expansion device. While increasing the pressure at the inlet of the second gas separation device enables sufficient differential pressure, it would also lead to higher energy consumption by a gas compression device in the system of the present disclosure, which is evidently disadvantageous. For an ordinary cryogenic recovery device, it would be obvious that the lower the temperature T1 at the gas phase outlet of the gas-liquid separation device is, the more liquid will be obtained, and the larger amount of hydrocarbons therefore will be recovered. However, the inventor of the present disclosure unexpectedly found out that, in the system for recovering gas emissions according to the present disclosure which combines compression refrigeration, membrane separation, and turbine expansion cryogenic refrigeration, because the sweep gas can be recycled, reduction of the temperature T1 at the gas phase outlet of the second gas-liquid separation device would not substantially change the recovery rate of hydrocarbons (see Table 2). That is, a high recovery rate of hydrocarbons can be still obtained by the system for recovering gas emissions according to the present disclosure without having to lower the temperature T1 at the gas phase outlet of the gas-liquid separation device. On the other hand, as has been stated above, higher temperature T1 at the gas phase outlet of the second gas-liquid separation device requires lower differential pressure from the inlet to the outlet of the turbine expansion device. Therefore, adoption of the system according to the present disclosure would reduce energy consumption.

TABLE 2

Relationship between recovery rate of hydrocarbons and temperature T1 at the gas phase outlet of the second gas-liquid separation device

| T1 (°C) | −100 | −110 | −120 | −130 |
|---|---|---|---|---|
| Recovery rate of hydrocarbons (wt %) | 92.73 | 92.90 | 93.02 | 93.09 |

According to the present disclosure, the second gas separation device is in the form of a cryogenic separation device, which incorporates the functions of a hydrocarbon recovery device and those of a sweep gas purification device in the prior art. As explained above, decreasing the temperature T1 at the gas phase outlet of the second gas-liquid separation device can ensure the purity of the sweep gas. Nevertheless, too low a temperature T1 at the gas phase outlet of the second gas-liquid separation device would result in too high a content of nitrogen in the liquid phase in the second gas-liquid separation device, thus failing to satisfy the requirement for the content of nitrogen in a second recovery product. Although said requirement varies with different customers, it can generally be defined as X, i.e., the molar ratio between nitrogen and olefin monomers for polymerization (such as ethylene or propylene), usually 10%. Obviously, the requirement for the above ratio cannot be satisfied, or the ratio is uncontrollable by the method as disclosed in CN 202485331. One solution to the above problem is for the second gas-liquid separation device to employ a fractionating column with a reboiler in the bottom thereof. However, the inventor of the present disclosure has amazingly found that when the second gas-liquid separation device according to the present disclosure combines a pressure container having no internal components and a third heat exchange device, the above ratio can be readily limited as about 4%. Hence, according to the present disclosure, the above ratio can be obtained by using a pressure container without any internal components or a fractionating column with less separation stages (see Table 3).

TABLE 3

The relationship between the ratio X and the separation stages of the fractionating column

| | The present disclosure | CN 202485331 | Separation stages: 2 | Separation stages: 5 | Separation stages: 10 |
|---|---|---|---|---|---|
| Ratio X/% | 4.0 | 16.6 | 3.6 | 3.7 | 3.8 |

Therefore, according to the present disclosure, the combination of the compression refrigeration technique, the membrane separation technique, and the turbine expansion cryogenic technique for recovering gas emissions generated in producing olefin polymers, can achieve not only high-efficiency recovery of hydrocarbons, but also recycle of the sweep gas. More significantly, the above recovery and recycle can both be performed with low energy consumption, thereby effectively reducing investment and production costs.

In the following, the present disclosure will be described in more detail with reference to specific embodiments.

FIG. 1 schematically shows the structure of a first embodiment of a system 100 for recovering gas emissions generated in the production of olefin polymers according to the present disclosure. As indicated in the figure, the system 100 for recovering gas emissions comprises a devolatilizer 110, a gas compression device 120, a first heat exchange device 125, and a first gas-liquid separation device 130 in successive connection with one another.

A gas emission 102 generated from a reaction system for producing olefin polymers is fed into the devolatilizer 110 by a transport gas carrier, preferably via an upper portion of the devolatilizer 110. Generally, the gas emission comprises the small molecular substance of hydrogen ($H_2$), and low-carbon hydrocarbons mainly including methane ($CH_4$), ethylene ($C_2H_4$), ethane ($C_2H_6$), 1-butene (1-$C_4H_8$), n-butane (n-$C_4H_{10}$), isopentane ($C_5H_{12}$), etc. A sweep gas 105 (such as nitrogen) is fed to the devolatilizer 110 as well, thereby performing devolatilization to a polyolefin resin so as to separate the resin from gasses such as hydrocarbons carried by or dissolved in the resin. Subsequently, a polyolefin resin 108 after being devolatilized is preferably discharged via a bottom portion of the devolatilizer 110, while a first fluid 112 generated therein is discharged via a top portion of the devolatilizer 110. The resin devolatilizer as disclosed in CN 102171256 can be used, for example.

The first fluid 112 then enters the gas compression device 120 to be compressed therein before subsequently entering the first heat exchange device 125 for cooling. The gas compression device 120 can be an ordinary gas compression device, for example, a single stage or multistage reciprocating compressor or a screw compressor. The first heat exchange device 125 can, for example, comprise one or a plurality of coolers in series or parallel connection with one another, with circulating cooling water and/or chilled water commonly used in an industrial plant as a cooling medium. The temperature at an outlet of the first heat exchange device 125 is associated with the pressure at an outlet of the gas compression device 120, so as to condense a majority of (more than 50%) C3-above heavy hydrocarbon components (propylene, propane, butene, etc.) in the gas emission into liquids. The above proportion can be determined by a person skilled in the art according to economic efficiency in the compression refrigeration process.

A first gas-liquid mixture 128 from the first heat exchange device 125 is fed into the first gas-liquid separation device 130 for separation. The first gas-liquid separation device 130 can be in the form of an ordinary gas-liquid separation tank, which outputs the liquid phase as a first recovery composition 131 (mainly comprising 1-butene, n-butane, isopentane, etc.) for recycling, and a first gas phase composition 132. In connection with this part, reference can for example be made to U.S. Pat. No. 4,372,758.

In can be easily understood that specific structures and operations of the aforementioned devices are well known by a person skilled in the art, and therefore will not be described in detail here for the sake of conciseness.

According to the present disclosure, the system 100 further comprises a separation unit 135 arranged downstream of the first gas-liquid separation device 130. As indicated in FIG. 1, the separation unit 135 mainly includes a first gas separation device 140 and a second gas separation device 150, which will be respectively explained below.

The first gas separation device 140 connects to the first gas-liquid separation device 130 for receiving non-condensed gas therefrom, i.e., the first gas phase composition 132 as described above. According to the present disclosure, the first gas separation device 140 employs a membrane system to remove small molecular substances, such as hydrogen. According to one embodiment, the first gas separation device 140 is in the form of the membrane system for separating hydrogen. The membrane system can, for example, comprise one or a plurality of membrane devices in series or parallel connection with one another.

According to the present disclosure, the first gas separation device 140 can use any membrane allowing high permeation rate of hydrogen and low permeation rate of nitrogen and hydrocarbons such as ethylene. Hence, besides a high selectivity to hydrogen, a membrane material to be selected should have good compatibility with the gas to be separated, a high structural strength for bearing high membrane differential pressures, a sufficiently high flux for certain separation parameters, etc. Membranes of the above kind can be made from polymer materials such as vitamin derivatives, polysulfone, polyamide, polyaramide, polyimide, and the like, or can be made from ceramics, glass, metals, etc. In one specific embodiment, the first gas separation device 140 uses the membrane as disclosed in EP 219878 or U.S. Pat. No. 5,085,774, preferably at least one selected from the group consisting of micro-porous inorganic ceramic membranes, hollow fiber membranes, metallic material membranes, and adsorption-diffusion membranes.

The first gas separation device 140 comprises two outlets, of which, one is configured as a permeation side rich in hydrogen of the membrane system and leads to a flare system as a tail gas discharge passage 141, and the other is configured as a retentate side that still substantially maintains an inlet pressure for outputting a second gas phase composition 142 to the second gas separation device 150.

The second gas separation device 150 is arranged downstream of the first gas separation device 140 for receiving the second gas phase composition 142 generated therefrom. According to the present disclosure, the second gas separation device is configured as a cryogenic separation device comprising at least one gas expansion device, which can perform throttling expansion to a gas that enters therein and do work outwardly, so as to cool down to a temperature at which ethylene is condensable, generally below −80° C. The gas expansion device, for example, can adopt a similar device generally used in the field of liquefied natural gas, etc. The second gas separation device further comprises at least one heat exchange device for heat transfer between and among materials therein so as to make full use of energy. In one preferred embodiment, the gas expansion device is in the form of a turboexpander, with the pressure at an outlet thereof arranged as required by the sweep gas. Where the gas expansion device provides inadequate cooling capacity for recovering light components such as ethylene, a proper amount of cryogens can be supplemented for heat transfer. However, it is also preferable to suitably increase the pressure at the outlet of the gas compression device to exactly balance energies therein.

Figure 2:
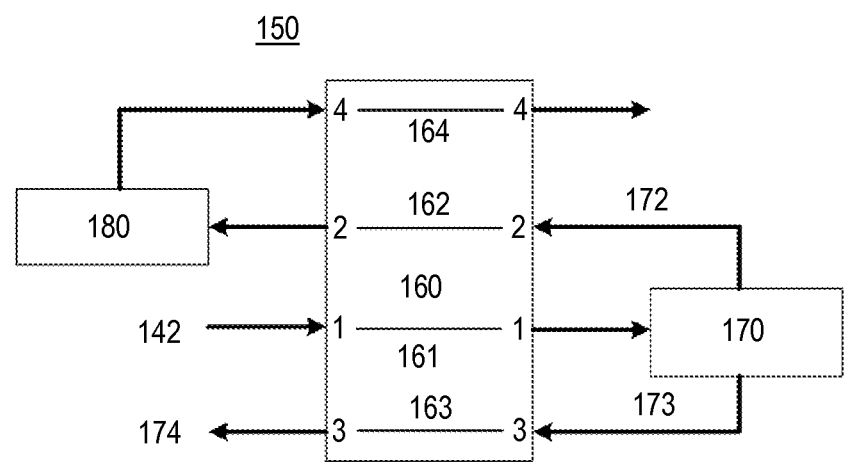
FIGS. 2 and 3 respectively show two specific forms of a second gas separation device in the system as shown in FIG. 1.

FIG. 2 shows one specific form of the second gas separation device 150 in the system 100 for recovering gas emissions as shown in FIG. 1. As indicated in the figure, the second gas separation device 150 comprises a second heat exchange device 160 which can be in the form of a plate-fin heat exchanger. One or a plurality of plate-fin heat exchangers in series or parallel connection with one another can be provided as required. In the embodiment as shown in FIG. 2, the second heat exchange device 160 is configured to have four internal flow channels 161 to 164. The first flow channel 161 has a first inlet for receiving the second gas phase composition 142 generated from the first gas separation device 140, and outputting the same to a second gas-liquid separation device 170 via a first outlet of the first flow channel 161. The second gas-liquid separation device 170 outputs a third gas phase composition 172 to the second flow channel 162 via a second inlet thereof, and meanwhile outputs a liquid phase composition 173 to the third flow channel 163 via a third inlet thereof. The third flow channel 163 outputs a gas-liquid mixture phase composition after heat transfer via a third outlet thereof as a second recovery product 174 (mainly comprising hydrocarbons). The third gas phase composition 172, after heat transfer in the second flow channel 162, is output via a second outlet thereof to a first gas expansion device 180, which performs throttling expansion therein and does work outwardly, so as to achieve a required low temperature. Subsequently, the third gas phase composition 172, after being treated in the first gas expansion device 180, enters the fourth flow channel via a fourth inlet and is output via a fourth outlet thereof.

According to the present disclosure, in the second heat exchange device 160, the four flow channels 161 to 164 are arranged in such a manner that every two adjacent flow channels are in opposite flow directions, so that effective heat transfer can be accomplished.

The second gas-liquid separation device 170 can for example be at least one selected from the group consisting of a pressure container, a plate column, and a packed column, or a combination thereof. Preferably, the second gas-liquid separation device 170 can be at least one selected from the group consisting of a pressure container, a plate column, and a packed column without any internal components, and more preferably a pressure container without any internal components.

The third gas phase composition 172 output from the separation unit 135 can be divided into two streams, of which one is fed to the flare system as a tail gas 176 for treatment, and the other, thanks to a proper pressure, can be output as a sweep gas 175 to the sweep gas 105 so as to be used together in the devolatilizer 110.

Therefore, the system 100 for recovering gas emissions according to the present disclosure can effectively recover hydrocarbons and recycle sweep gases, thereby significantly improving efficiency and reducing energy consumption.

Figure 3:
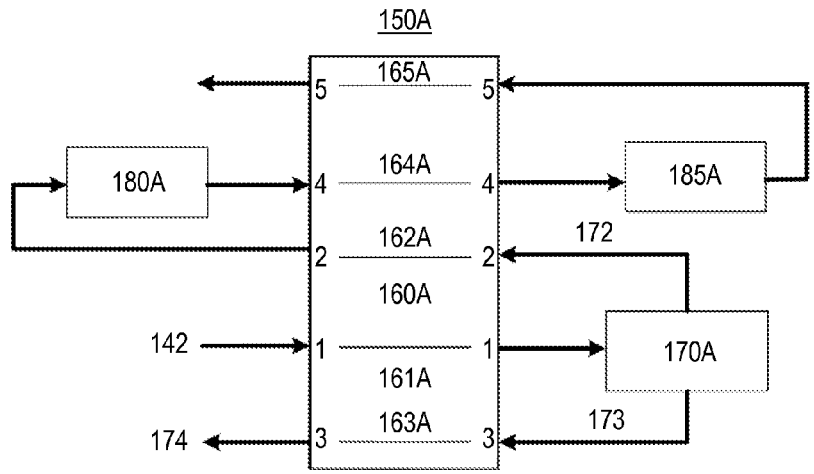

FIG. 3 shows another specific form of the second gas separation device 150A in the system 100 as shown in FIG. 1. The second gas separation device 150A is distinguished from the second gas separation device 150 in that a second gas expansion device 185A, in addition to the first gas expansion device 180A, is provided, thereby solving the problem of restriction associated with the expansion ratio of one single turboexpander (usually below 5). It can be easily understood that under the above circumstance, the second heat exchange device 160A further comprises a fifth flow channel 165A for receiving a gas output from the second gas expansion device 185A and outputting the tail gas 176 and the sweep gas 175.

Figure 4:
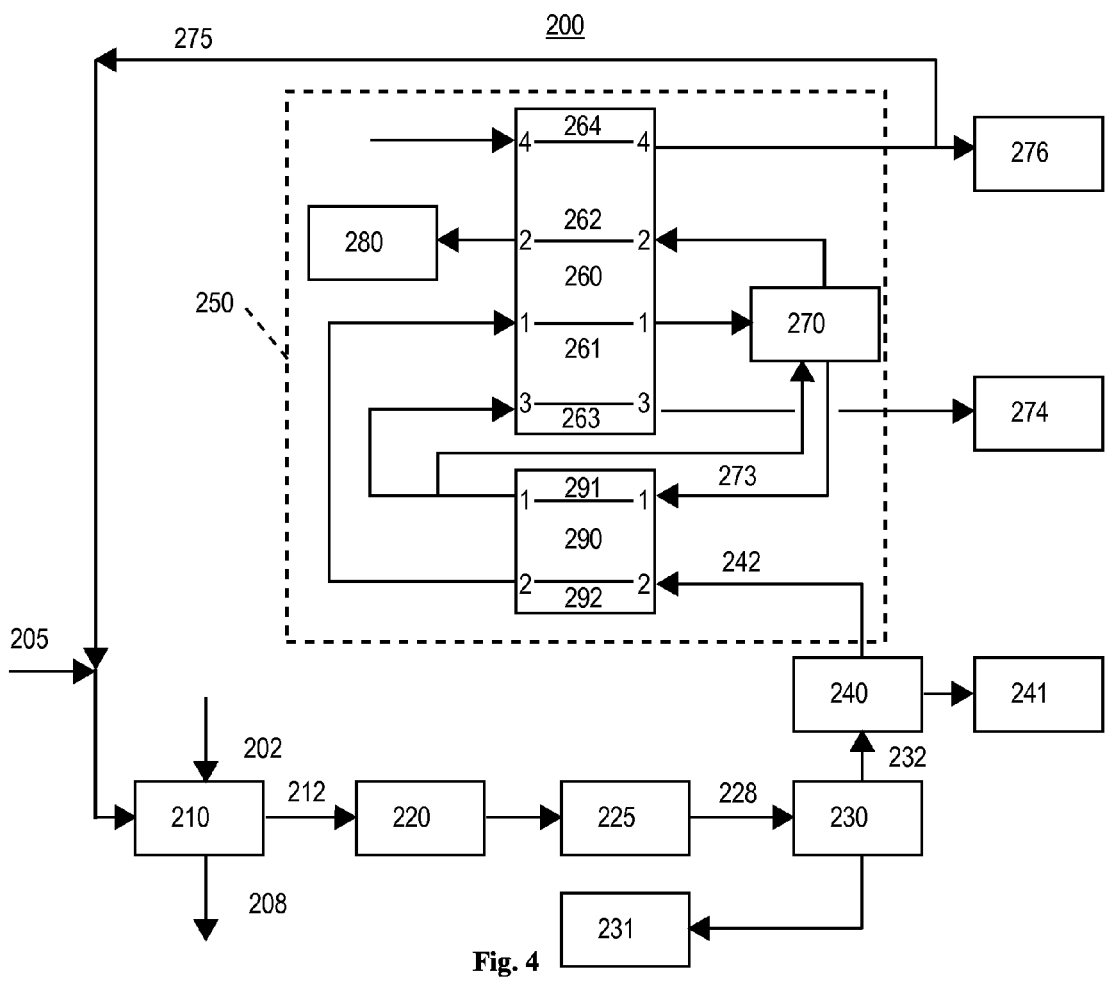
FIGS. 4 and 5 schematically show the structures of a second embodiment and a third embodiment of the system for recovering gas emissions generated in the production of olefin polymers according to the present disclosure, respectively.

FIG. 4 schematically shows a system 200 for recovering gas emissions generated in the production of olefin polymers according to a second embodiment of the present disclosure. The system 200 differs from the system 100 as shown in FIG. 1 in that besides the second heat exchange device 260, the second gas separation device 250 further comprises a third heat exchange device 290 which has two internal flow channels 291 and 292. The second gas phase composition 242 that comes from the first gas separation device 240 first enters the second flow channel 292 of the third heat exchange device 290, and then after heat transfer, enters the first flow channel 261 of the second heat exchange device 260. Moreover, the liquid phase composition 273 output from the second gas-liquid separation device 270 enters the first flow channel 291 of the third heat exchange device 290. After heat transfer therein, a first output portion of a liquid output from the first flow channel 291 of the third heat exchange device 290 enters the third flow channel 263 of the second heat exchange device 260, and after heat transfer serves as the second recovery product 274, while a second output portion thereof returns to the second gas-liquid separation device 270.

The arrangement of the third heat exchange device 290 facilitates more effective use of the cooling capacity in the entire system 200 for recovering gas emissions, thus further reducing energy consumption and increasing efficiency.

In particular, the molar ratio between nitrogen and olefin monomers for polymerization in the second recovery product can be reduced more effectively through dividing the liquid output from the first flow channel 291 of the third heat exchange device 290 into two portions, with one portion thereof returning to the second gas-liquid separation device 270 while the other portion entering the third flow channel 263 of the second heat exchange device 260 and being output as the second recovery product 274. In one embodiment, it is determined that the ratio of the flow of the second output portion that comes from the first flow channel 291 of the third heat exchange device 290 and returns to the second gas-liquid separation device 270 to the total flow of the first flow channel 291 at the first outlet thereof ranges from 0:1 to 1:1, preferably from 0.3:1 to 0.7:1.

Figure 5:
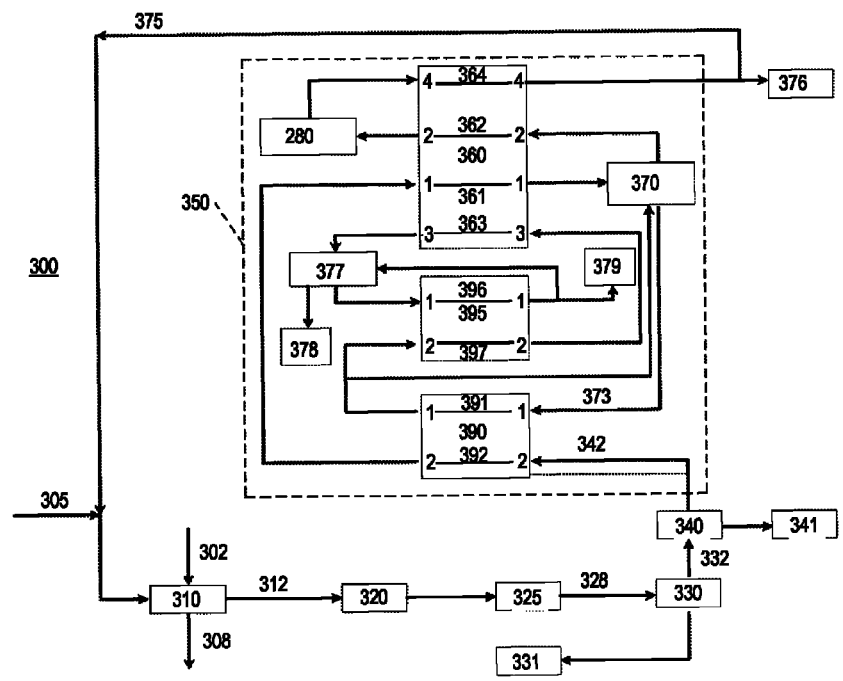

FIG. 5 shows a system 300 for recovering gas emissions generated in the production of olefin polymers according to a third embodiment of the present disclosure. The differences between the system 300 and the system 200 as shown in FIG. 4 lie in that in addition to the second heat exchange device 360 and the third heat exchange device 390, the second gas separation device 350 further comprises a fourth heat exchange device 395. As indicated in FIG. 5, the fourth heat exchange device 395 includes two internal flow channels 396 and 397.

In the embodiment as shown in FIG. 5, the second gas phase composition 342 from the first gas separation device 340 first enters the second flow channel 392 of the third heat exchange device 390, and then enters the first flow channel 361 of the second heat exchange device 360. Moreover, the liquid phase composition 373 output from the second gas-liquid separation device 370 enters the first flow channel 391 of the third heat exchange device 390, and after heat transfer, is divided into two portions, with one portion returning to the second gas-liquid separation device 370 while the other portion simultaneously entering the second flow channel 397 of the fourth heat exchange device 395 and after heat transfer, entering the third flow channel 363 of the second heat exchange device 360. Subsequently, a gas-liquid mixture phase composition formed in the third flow channel 363 of the second heat exchange device 360 is output from the third outlet and enters a third gas-liquid separation device 377, which can be a similar separation device as described above.

After gas-liquid separation in the third gas-liquid separation device 377, the liquid phase composition is output and recovered as a third recovery product 378 (mainly comprising 1-butene, n-butane, isopentane, etc.). The gas phase composition 372 output therefrom enters the first flow channel of the fourth heat exchange device, and after heat transfer, a third output portion is output and fed to the third gas-liquid separation device 377, while a fourth output portion is output and recovered as a fourth recovery product 379 (mainly comprising ethylene, nitrogen, etc.). Preferably, the ratio of the third output portion that returns to the third gas-liquid separation device 377 to the total output of the first flow channel of the fourth heat exchange device can be determined in the range from 0:1 to 1:1, preferably from 0.3:1 to 0.7:1.

According to the third embodiment as indicated in FIG. 5, the system 300 for recovering gas emissions of the present disclosure can effectively recover the cooling capacity in the entire system, adequately recover multiple products, and maximally utilize the gas emissions.

Figure 6:
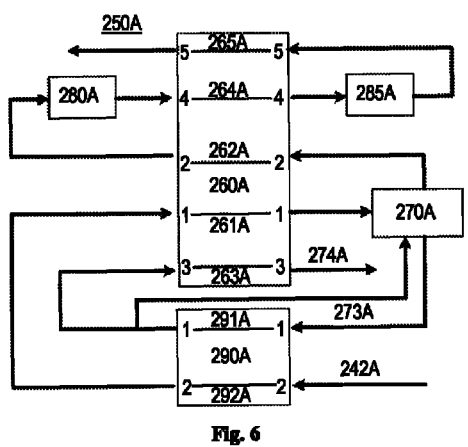
FIG. 6 shows another specific form of the second gas separation device in the system as shown in FIG. 4.

FIG. 6 shows the second gas separation device 250A of the system 200 for recovering gas emissions as indicated in FIG. 4. In the embodiment as shown in FIG. 6, similarly with the second gas separation device 150A as shown in FIG. 3, the second gas separation device 250A comprises the second gas expansion device 285A, thus acquiring similar advantages of the second gas separation device 150A as shown in FIG. 3.

The system for recovering gas emissions according to the present disclosure will be further illustrated in connection with the examples and comparative examples below.

Example 1

Figure 7:
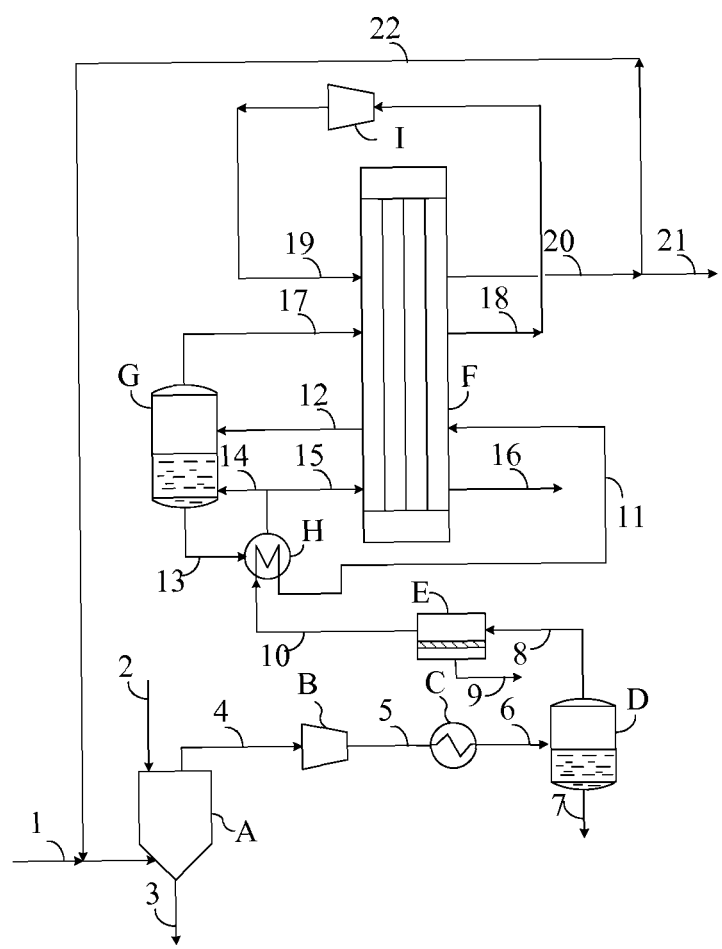
FIGS. 7 and 8 are schematic diagrams of the systems as used in Examples 1 and 2 respectively.

A device for recovering gas emissions as shown in FIG. 7 is used for treatment of the gas emissions generated from a gas-phase polyethylene plant with an annual output of 400,000 tons of polyethylene resins, recovering low-carbon hydrocarbons in the gas emissions. Said device for recovering gas emissions comprises a devolatilizer A, a gas compression device B, a first heat exchange device C, a first gas-liquid separation device D, a first gas separation device E, a second heat exchange device F, a second gas-liquid separation device G, a third heat exchange device H, and a gas expansion device I. In the first gas separation device, a membrane system is selected to separate hydrogen from the gas emissions. The second gas separation device includes the second heat exchange device F, the second gas-liquid separation device G, the third heat exchange device H, and the gas expansion device I which is in the form of a turboexpander.

Specific processes are as follows. First, a polyolefin resin 2 from a reaction system is fed into the devolatilizer A by a transport gas carrier, wherein nitrogen ($N_2$) is used as a sweep gas to perform devolatilization to the polyethylene resin. The gas emissions contain small molecular substance of hydrogen ($H_2$), and low-carbon hydrocarbons mainly comprising methane ($CH_4$), ethylene ($C_2H_4$), ethane ($C_2H_6$), 1-butene (1-$C_4H_8$), n-butane (n-$C_4H_{10}$), isopentane ($C_5H_{12}$), etc. After the devolatilization, a polyolefin resin 3 and a gas emission 4 are respectively discharged from the bottom and top of the devolatilizer A. The gas emission 4 is compressed by the gas compression device B and then cooled in the first heat exchange device C to generate a gas-liquid mixture 6, which is to be performed gas-liquid separation in the first gas-liquid separation device D. From the first gas-liquid separation device D, a liquid phase 7 is output for recycling, and a gas phase 8 for entering the first gas separation device E to be removed of small molecular substances, such as hydrogen. A gas 9 rich in small molecular substances from the first gas separation device is discharged into a flare system, while a gas 10 rich in hydrocarbons enters the third heat exchange device H for heat transfer before entering the second heat exchange F via a first inlet thereof. A gas-liquid mixture 12 from the second heat exchange device F via a first outlet thereof is performed gas-liquid separation in the second gas-liquid separation device G, whereby a liquid phase composition 13 enters the third heat exchange device H, and after heat transfer, is divided into two streams, of which one stream 14 flows back to the second gas-liquid separation device G, while the other stream 15 enters the second heat exchange device F via a third inlet thereof for recovering cooling capacity. Afterwards, a gas-liquid mixture phase product 16 is output from the second heat exchange device F via a third outlet thereof for recycling. A gas phase composition 17 from the second gas-liquid separation device G enters the second heat exchange device F via a second inlet thereof for recycling cooling capacity. A gas 18 from the second heat exchange device F via the second outlet thereof enters the gas expansion device I, from which a gas 19 is output and fed into the second heat exchange device F via a fourth inlet thereof for recovering cooling capacity. A gas 20 output from the second heat exchange device F via the fourth outlet thereof is divided into two streams, of which one stream 21 is discharged to the flare and the other stream 22 enters the devolatilizer after being mixed with a fresh sweep gas 1. The second gas-liquid separation device G is selected as an empty column having a reboiler in the bottom thereof.

The material balance data in the device for recovering gas emissions are shown in Table 4, based on which it can be calculated that the hydrogen removal rate in the first gas separation device (a membrane separation system) is 58%, and the removal rates of the hydrocarbon components of ethylene, isopentane, and 1-butene, in the device for recovering gas emissions are 91.64%, 96.42%, and 95.81%, respectively. In the recycled gas, nitrogen has a molar fraction of 94.7% and a recovery rate of 87.19%. The results indicate that the device for recovering gas emissions according to the present disclosure does not only have high removal rates of small molecular substances (hydrogen) and high recovery rates of low-carbon hydrocarbons, but also achieves recycling of the sweep gas into the resin devolatilizer, which represent rather significant effects.

TABLE 4

Material balance in Example 1

| Streams | Raw gas | Permeated gas | Retentate gas | Gas-liquid mixture hydrocarbons | Recycled nitrogen |
|---|---|---|---|---|---|
| Temperature/° C. | 40 | 40 | 40 | −10 | 35 |
| Pressure/MPaG | 1.33 | 0.1 | 1.28 | 1.285 | 0.2 |
| Gas phase fraction | 1 | 1 | 1 | 0.75 | 1 |
| Mass flow rate kg/hr | 1569.22 | 173.59 | 1395.63 | 235.44 | 1160.19 |
| Weight-average molecular weight | 27.80 | 25.07 | 28.18 | 33.24 | 27.34 |
| Mass flow kg/hr | | | | | |
| Hydrogen | 2.77 | 1.55 | 1.23 | 0.00029 | 1.23 |
| Methane | 21.97 | 1.99 | 19.98 | 2.80 | 17.18 |
| Nitrogen | 1292.81 | 163.45 | 1129.36 | 5.74 | 1123.62 |
| Ethylene | 162.96 | 4.23 | 158.72 | 141.10 | 17.62 |
| Ethane | 12.64 | 0.33 | 12.32 | 11.80 | 0.52 |
| 1-butene | 51.93 | 1.35 | 50.58 | 50.58 | 0.0039 |
| N-butane | 17.00 | 0.44 | 16.56 | 16.55 | 0.0048 |
| Isopentane | 7.13 | 0.25 | 6.88 | 6.88 | 3.11E−05 |

Example 2

Figure 8:
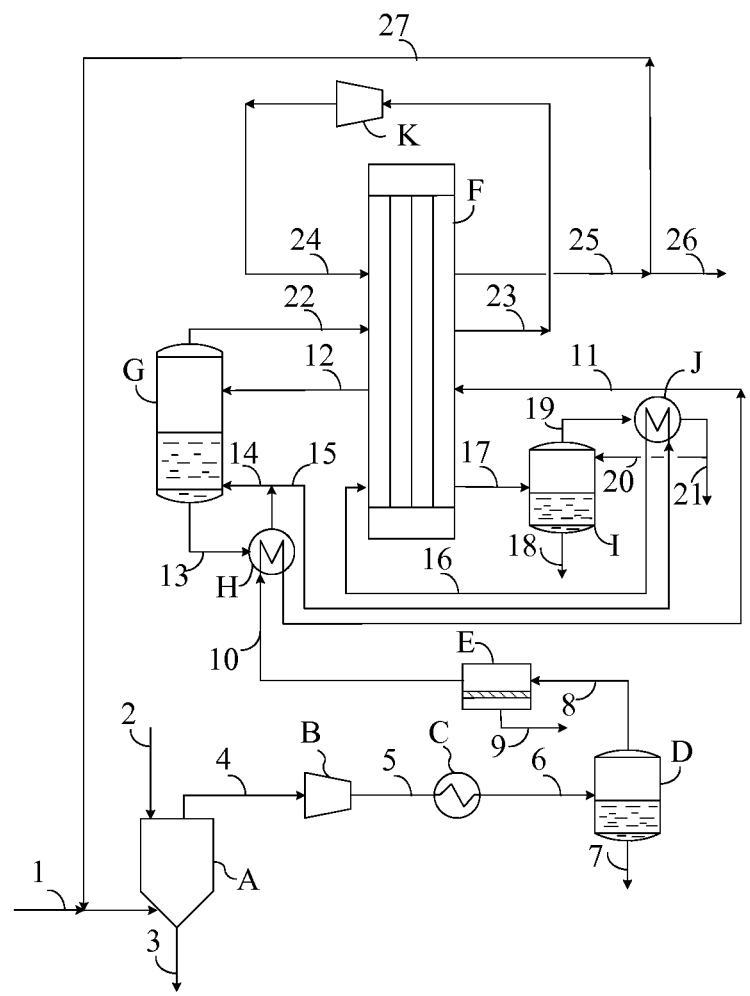

A device for recovering gas emissions as shown in FIG. 8 is used for treatment of the gas emissions generated from a gas-phase polyethylene plant with an annual output of 400,000 tons of polyethylene resins, recovering low-carbon hydrocarbons in the gas emissions. Said device for recovering gas emissions comprises a devolatilizer A, a gas compression device B, a first heat exchange device C, a first gas-liquid separation device D, a first gas separation device E, a second heat exchange device F, a second gas-liquid separation device G, a third heat exchange device H, a third gas-liquid separation device I, a fourth heat exchange device J, and a gas expansion device K. In the first gas separation device, a membrane system is selected to separate hydrogen from the gas emissions. The second gas separation device includes the second heat exchange device F, the second gas-liquid separation device G, the third heat exchange device H, the third gas-liquid separation device I, the fourth heat exchange device J, and the gas expansion device K which is in the form of a turboexpander.

Specific processes are as follows. A polyolefin resin 2 from a reaction system is fed into the devolatilizer A by a transport gas carrier, wherein nitrogen ($N_2$) is used as a sweep gas to perform devolatilization to the polyethylene resin. The gas emissions contain small molecular substance of hydrogen ($H_2$), and low-carbon hydrocarbons mainly comprising methane ($CH_4$), ethylene ($C_2H_4$), ethane ($C_2H_6$), 1-butene (1-$C_4H_8$), n-butane (n-$C_4H_{10}$), isopentane ($C_5H_{12}$), etc. After the devolatilization, a polyolefin resin 3 and a gas emission 4 are respectively discharged from the bottom and top of the devolatilizer A. The gas emission 4 is compressed by the gas compression device B and then cooled in the first heat exchange device C to generate a gas-liquid mixture 6, which is to be separated in the first gas-liquid separation device D. From the first gas-liquid separation device D, a liquid phase 7 is output for recycling, and a gas phase 8 for entering the first gas separation device E to be removed of small molecular substances, such as hydrogen. A gas 9 rich in small molecular substances from the first gas separation device is discharged into a flare system, while a gas 10 rich in hydrocarbons enters the third heat exchange device H for heat transfer before entering the second heat exchange F via a first inlet thereof. A gas-liquid mixture 12 from the second heat exchange device F via a first outlet thereof is performed gas-liquid separation in the second gas-liquid separation device G, whereby a liquid phase composition 13 enters the third heat exchange device H, and after heat transfer, is divided into two streams, of which one stream 14 flows back to the second gas-liquid separation device G, while the other stream 15 enters the fourth heat exchange device J before entering the second heat exchange device F via a third inlet thereof for recovering cooling capacity. Afterwards, a gas-liquid mixture phase product 16 is output from the second heat exchange device F via a third outlet thereof and enters the third gas-liquid separation device I. From the third gas-liquid device I, a liquid phase 17 is output as a recovery product, while a gas phase 19, after heat transfer in the fourth heat exchange device J, is divided into two streams, of which one stream 20 flows back to the third gas-liquid separation device I, and the other stream 21 is recovered as a product. A gas phase composition 22 from the second gas-liquid separation device G enters the second heat exchange device F via a second inlet thereof for recycling cooling capacity. A gas 23 from the second heat exchange device F via the second outlet thereof enters the gas expansion device K, from which a gas 24 is output and fed into the second heat exchange device F via a fourth inlet thereof for recovering cooling capacity. A gas 25 from the second heat exchange device F via the fourth outlet thereof is divided into two streams, of which one stream 26 is discharged to the flare and the other stream 27 enters the devolatilizer after being mixed with a fresh sweep gas 1. The second gas-liquid separation device G is selected as an empty column having a reboiler in the bottom thereof.

In Example 2, exactly the same objects are simulated under completely the same conditions as in Example 1. Example 2 is different from Example 1 in that the gas-liquid mixture product 16, after passing through a gas-liquid separation tank having a condenser, is divided into an ethane-enriched gas phase 21 and a C4-enriched liquid phase 18, wherein the gas phase 21 is recycled to an ethane cracking device, while the liquid phase 18, after being mixed with the liquid phase 7, is recycled to an ethylene polymerization device. The condenser performs the function of enhancing the separation efficiency of C4, so as to secure more C4 in the liquid phase 18. A separation coefficient K is defined as the molar percent of C4 in the liquid phase 18 divided by the molar percent of C4 in the gas phase 21. The simulation has found that when no condenser is arranged, butene has a K value of 10.57 and n-butane has a K value of 10.09. When a condenser is arranged, butene has a K value of 31.85, and n-butane has a K value of 24.52. The results indicate that the condenser plays a significant role in improving the separation efficiency of C4.

Comparative Example 1

Figure 9:
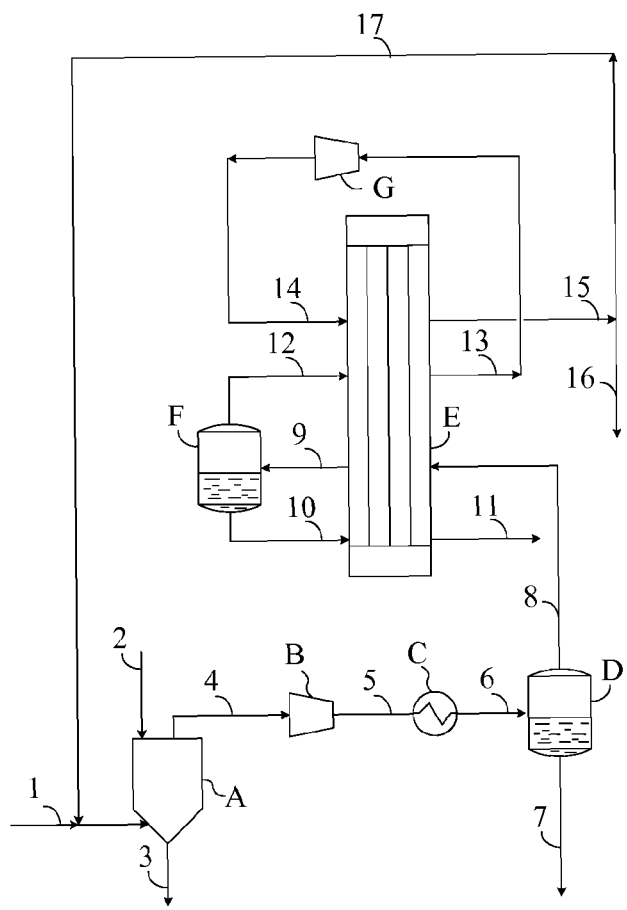
FIGS. 9 and 10 are schematic diagrams of the systems as used in Comparative Examples 1 and 2, respectively.

A device for recovering gas emissions as shown in FIG. 9 is used for treatment of the gas emissions generated from a gas-phase polyethylene plant with an annual output of 400,000 tons of polyethylene resins, recovering low-carbon hydrocarbons in the gas emissions. Said device for recovering gas emissions comprises a devolatilizer A, a gas compression device B, a first heat exchange device C, a first gas-liquid separation device D, a second heat exchange device E, a second gas-liquid separation device F, and a gas expansion device G. The gas separation device includes the second heat exchange device E, the second gas-liquid separation device F, and the gas expansion device G. Compared with Example 1, Comparative Example 1 does not use a membrane system as a first gas separation device and merely adopts one turboexpander as the gas expansion device.

Specific processes are as follows. A polyolefin resin 2 from a reaction system is fed into the devolatilizer A by a transport gas carrier. After devolatilization, a polyolefin resin 3 and a gas emission 4 are respectively discharged from the bottom and top of the devolatilizer A. The gas emission 4 is compressed by the gas compression device B and then cooled in the first heat exchange device C to generate a gas-liquid mixture 6, which is to be performed gas-liquid separation in the first gas-liquid separation device D. From the first gas-liquid separation device D, a liquid phase 7 is output for recycling, and a gas phase 8 for entering the second heat exchange device E via a first inlet thereof. A gas-liquid mixture 9 from the second heat exchange device E via a first outlet thereof is performed gas-liquid separation in the second gas-liquid separation device F, whereby a liquid phase composition 10 enters the second heat exchange device E via a third inlet thereof for recovering cooling capacity, while a gas-liquid mixture phase product 11 from the second heat exchange device E via a third outlet thereof is recycled. A gas phase composition 12 enters the second heat exchange device E via a second inlet thereof for recovering cooling capacity, and a gas 13 from the second heat exchange device E via a second outlet thereof enters the gas expansion device G. A gas 14 from the gas expansion device G enters the second heat exchange device E via a fourth inlet thereof for recycling cooling capacity. A gas 15 from the second heat exchange device E via a fourth outlet thereof is divided into two streams, of which, one stream 16 is discharged to a flare and the other stream 17 enters the devolatilizer A after being mixed with a fresh sweep gas 1.

In Comparative Example 1, exactly the same objects are simulated under completely the same conditions as in Example 1. Comparative Example 1 is different from Example 1 in that Comparative Example 1 does not employ a gas membrane separation device. Simulating calculation shows that the recovery rates of ethylene, isopentane, and 1-butene, in the device for recovering gas emissions are respectively 96.65%, 99.99%, and 99.99%. In the recycled gas, nitrogen has a molar fraction of 92.67% and a recovery rate of 70.35%.

Comparative Example 2

Figure 10:
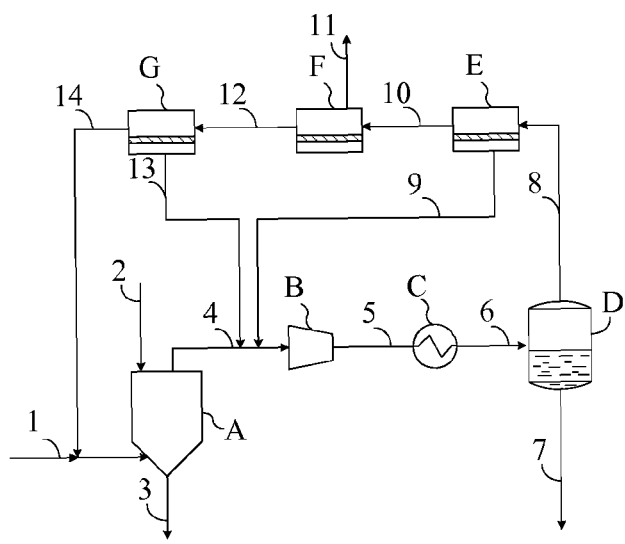

A device for recovering gas emissions as shown in FIG. 10 is used for treatment of the gas emissions generated from a gas-phase polyethylene plant with an annual output of 400,000 tons of polyethylene resins, recovering low-carbon hydrocarbons in the gas emissions. Said device for recovering gas emissions comprises a devolatilizer A, a gas compression device B, a heat exchange device C, a gas-liquid separation device D, a first gas separation device E, a second gas separation device F, and a third gas separation device G. The three gas separation devices are all in the form of membrane separation devices.

Specific processes are as follows. A polyolefin resin 2 from a reaction system is fed into the devolatilizer A by a transport gas carrier. After devolatilization, a polyolefin resin 3 and a gas emission 4 are respectively discharged from the bottom and top of the devolatilizer A. The gas emission 4 is compressed by the gas compression device B and then cooled in the heat exchange device C to generate a gas-liquid mixture 6, which is to be performed gas-liquid separation in the gas-liquid separation device D. From the gas-liquid separation device D, a liquid phase 7 is output for recycling, and a gas phase 8 for entering the first gas separation device E. A gas 9 from the first gas separation device E returns to the compression device B via an inlet thereof while another gas 10 enters the second gas separation device F. A gas 11 from the second gas separation device F is discharged to a flare while another gas 12 therefrom enters the third gas separation device G. A gas 13 from the third gas separation device is divided into two streams, of which one stream 13 returns to the compression device B via an inlet thereof and the other stream 14 enters the devolatilizer after being mixed with a fresh sweep gas 1.

In Comparative Example 2, exactly the same objects are simulated under completely the same conditions as in Example 1. Comparative Example 2 is different from Example 1 in that Comparative Example 2 employs a three-stage gas membrane separation device but does not use a cryogenic separation device having a turboexpander. Simulating calculation shows that the recovery rates of ethylene, isopentane, and 1-butene, in the device for recovering gas emissions are respectively 96.76%, 98.21%, and 98.04%. In the recycled gas, nitrogen has a molar fraction of 96.83% and a recovery rate of 81.87%.

Table 5 indicates recovery rates of hydrocarbons, recovery rates of nitrogen, and purities of recycled nitrogen respectively in the above two examples and comparative examples. As can be seen from Table 5, compared with Comparative Example 1, while maintaining a high recovery rate of hydrocarbons, the technical solution of the present disclosure further improves purity and recovery rate of nitrogen. Compared with Comparative Example 2, the technical solution of the present disclosure obtains higher recovery rate of nitrogen. Furthermore, in Comparative Example 2, it requires higher pressure (about 2.5 MPa) at the outlet of the compression device to ensure separation efficiency of the membrane, which is much higher than the pressure as required in the present disclosure (about 1.6 MPa), thus leading to higher investments on devices and more energy consumption.

TABLE 5

Comparisons of recovery efficiency of gas
emissions between and among four
recovery solutions

|  | Recovery rate of hydrocarbons/% | Recovery rate of nitrogen/% | Purity of recycled nitrogen mol % |
|---|---|---|---|
| Example 1 | 97.38 | 87.36 | 94.52 |
| Example 2 | 97.38 | 87.36 | 94.52 |
| Comparative Example 1 | 97.78 | 70.35 | 92.67 |
| Comparative Example 2 | 96.89 | 81.87 | 96.83 |

As can be concluded from the above examples and comparative examples, the system for recovering gas emissions according to the present disclosure can achieve higher recovery rates of hydrocarbons and nitrogen with energy consumption of devices and investment costs both significantly reduced.

Although the present disclosure has been discussed with reference to the above examples, it extends beyond the specifically disclosed examples to other alternative examples and use of the disclosure and obvious modifications and equivalents thereof. The scope of the present disclosure herein disclosed should not be limited by the particular disclosed examples as described above, but encompasses any and all technical solutions following within the scope of the following claims.

The invention claimed is:

1. A system for recovering emissions generated from an olefin polymerization process, comprising:
    a devolatilizer for receiving a fresh sweep gas and emissions generated from the olefin polymerization process and outputting a first fluid and a polyolefin resin;
    a compression refrigeration unit having a compression device and a first heat exchange device, for receiving said first fluid and outputting a first gas-liquid mixture;
    a first gas-liquid separation device for separating the first gas-liquid mixture and outputting a first recovery product and a first gas phase composition;
    a first gas separation device for receiving the first gas phase composition, removing small molecular substances therefrom, and outputting a composition rich in small molecular gases and a second gas phase composition rich in hydrocarbons; and
    a second gas separation device having a second heat exchange device, a second gas-liquid separation device, and a first gas expansion device,
    wherein the second heat exchange device comprises a first flow channel for receiving the second gas phase composition and feeding the same to the second gas-liquid separation device, a second flow channel for receiving a third gas phase composition that comes from the second gas-liquid separation device and feeding the same to the first gas expansion device, a third flow channel for receiving a liquid phase composition that comes from the second gas-liquid separation device and outputting the same as a second recovery product, and a fourth flow channel for receiving a gas that comes from the first gas expansion device and outputting a fourth gas phase composition which includes a recycle sweep gas that can be added to the fresh sweep gas.

2. The system for recovering emissions according to claim 1, wherein the second gas separation device further comprises a second gas expansion device, and the second heat exchange device further comprises a fifth flow channel, wherein the fourth gas phase composition is output after passing through the second gas expansion device and the fifth flow channel.

3. The system for recovering emissions according to claim 1, wherein the second gas separation device further comprises a third heat exchange device which has a first flow channel for receiving the liquid phase composition that comes from the second gas-liquid separation device, and outputting a first output portion to a third flow channel of the second heat exchange device and a second output portion which returns to the second gas-liquid separation device,
    wherein the third heat exchange device has a second flow channel for receiving the second gas phase composition and feeding the same to the first flow channel of the second heat exchange device.

4. The system for recovering emissions according to claim 3, wherein the second gas separation device further comprises a third gas-liquid separation device and a fourth heat exchange device,
    wherein the third gas-liquid separation device connects to an outlet of the third flow channel of the second heat exchange device and outputs a third recovery product and a fifth gas phase composition;
    wherein the fourth heat exchange device has a first flow channel for receiving the fifth gas phase composition that comes from the third gas-liquid separation device, and outputting a third output portion which returns to the third gas-liquid separation device and a fourth output portion as a fourth recovery product; and
    wherein the fourth heat exchange device has a second flow channel for receiving the first output portion that comes from the first flow channel of the third heat exchange device and outputting the same to the third flow channel of the second heat exchange device.

5. The system for recovering emissions according to claim 3, wherein the ratio of the second output portion to the sum of the first and second output portions ranges from 0:1 to 1:1, preferably from 0.3:1 to 0.7:1.

6. The system for recovering emissions according to claim 4, wherein the ratio of the third output portion to the sum of the third and fourth output portions ranges from 0:1 to 1:1, preferably from 0.3:1 to 0.7:1.

7. The system for recovering emissions according to claim 1, wherein the first gas separation device is configured as a membrane separation system for removing hydrogen from the first gas phase composition.

8. The system for recovering emissions according to claim 1, wherein the second gas-liquid separation device is in the form of a separation tank having a bottom heater or in the form of a separation column having a reboiler.

9. The system for recovering emissions according to claim 1, wherein the second gas-liquid separation device is constructed as at least one selected from the group consisting of a pressure container, a plate column, and a packed column, preferably containing no internal components.

10. The system for recovering emissions according to claim 1, wherein every two adjacent flow channels are configured to have opposite flow directions parallel with each other.

11. The system for recovering emissions according to claim 1, wherein the first and second gas expansion devices are both in the form of turboexpanders.

12. The system for recovering emissions according to claim 1, wherein the first recovery product comprising 1-butene, n-butane, and isopentane, the second recovery product comprising hydrocarbons, the third recovery product comprising 1-butene, n-butane, and isopentane, and the fourth recovery product comprising ethylene and nitrogen are generated.

* * * * *